US010608811B2

(12) United States Patent
Chen et al.

(10) Patent No.: US 10,608,811 B2
(45) Date of Patent: Mar. 31, 2020

(54) PRIVATE SET INTERSECTION ENCRYPTION TECHNIQUES

(71) Applicant: Microsoft Technology Licensing, LLC, Redmond, WA (US)

(72) Inventors: Hao Chen, Seattle, WA (US); Kim Laine, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 15/624,469

(22) Filed: Jun. 15, 2017

(65) Prior Publication Data

US 2018/0367293 A1 Dec. 20, 2018

(51) Int. Cl.
| | |
|---|---|
| *H04L 9/14* | (2006.01) |
| *H04L 9/30* | (2006.01) |
| *H04L 9/00* | (2006.01) |
| *H04L 9/06* | (2006.01) |
| *H04L 9/08* | (2006.01) |
| *H04L 29/06* | (2006.01) |

(52) U.S. Cl.
CPC ............ *H04L 9/008* (2013.01); *H04L 9/0618* (2013.01); *H04L 9/0861* (2013.01); *H04L 9/14* (2013.01); *H04L 9/30* (2013.01); *H04L 63/0428* (2013.01); *H04L 2209/46* (2013.01)

(58) Field of Classification Search
CPC ..... H04L 9/008; H04L 9/0618; H04L 9/0861; H04L 9/14; H04L 9/30; H04L 63/0428
See application file for complete search history.

(56) References Cited

U.S. PATENT DOCUMENTS

| | | | |
|---|---|---|---|
| 8,515,058 B1* | 8/2013 | Gentry | H04L 9/008 380/28 |
| 8,630,409 B2 | 1/2014 | Woodruff | |
| 9,009,089 B1* | 4/2015 | El Defrawy | G06F 16/90344 706/18 |
| 9,158,925 B2 | 10/2015 | Kamara | |
| 9,646,306 B1* | 5/2017 | Quigley | G06Q 20/4012 |
| 9,942,032 B1* | 4/2018 | Kornaropoulos | H04L 9/008 |
| 2006/0245587 A1* | 11/2006 | Pinkas | H04L 9/085 380/28 |
| 2007/0005594 A1 | 1/2007 | Pinkas et al. | |
| 2013/0073850 A1* | 3/2013 | Zaverucha | H04L 9/0869 713/168 |
| 2013/0329883 A1* | 12/2013 | Tamayo-Rios | H04L 9/008 380/28 |

(Continued)

OTHER PUBLICATIONS

Aydin Abadi et al, O-PSI: Delegated Private Set Intersection on Outsourced Datasets, IFIP International Federation for Information Processing. (Year: 2015).*

(Continued)

*Primary Examiner* — Shanto Abedin
(74) *Attorney, Agent, or Firm* — Newport IP, LLC; Scott Y. Shigeta; Tim R. Wyckoff

(57) ABSTRACT

The disclosure herein relates to private set intersection techniques. The described private set intersection techniques enable entities to determine common data strings in their respective data sets. The private set intersection techniques described herein allow those common data strings to be shareable between the entities, while maintaining the secrecy of other data strings stored in their respective data sets.

17 Claims, 5 Drawing Sheets

(56) References Cited

U.S. PATENT DOCUMENTS

| | | | | |
|---|---|---|---|---|
| 2014/0233727 | A1* | 8/2014 | Rohloff | G06F 16/3347 380/28 |
| 2015/0149763 | A1* | 5/2015 | Kamara | H04L 9/083 713/150 |
| 2016/0044003 | A1* | 2/2016 | Raykova | H04L 9/008 713/150 |
| 2016/0182222 | A1* | 6/2016 | Rane | H04L 9/008 713/168 |
| 2017/0104590 | A1* | 4/2017 | Wang | H03M 13/05 |
| 2017/0230171 | A1* | 8/2017 | Gadepally | H04L 9/0894 |

OTHER PUBLICATIONS

Meishan Huang et al, Privacy-Preserving Multi-set Operations, IEEE (Year: 2012).*

Kerschbaum, Florian, "Outsourced Private Set Intersection Using Homomorphic Encryption", In Proceedings of the 7th ACM Symposium on Information, Computer and Communications Security, May 2, 2012, 10 pages.

Xiuguang, et al., "Two-Dimensional Private Set Intersection in Big Data", In Proceedings of International Conference on Intelligent Networking and Collaborative Systems, Sep. 2, 2015, pp. 407-410.

Cristofaro, et al., "Fast and Private Computation of Cardinality of Set Intersection and Union", In Proceedings of International Conference on Cryptology and Network Security, Dec. 12, 2012, pp. 1-18.

Armknech, et al., "A Guide to Fully Homomorphic Encryption", In Journal of IACR Cryptology ePrint Archive: Report 2015/1192, 2015, pp. 1-35.

Asharov, et al, "Multiparty computation with low communication, computation and interaction via threshold FHE", In Proceedings of the 31st Annual international conference on Theory and Applications of Cryptographic Techniques, Apr. 15, 2012, pp. 483-501.

Albrecht, Martin R., "On dual lattice attacks against small-secret LWE and parameter choices in HElib and SEAL", In Journal of Cryptology ePrint Archive: Report 2017/047, 2017, pp. 1-29.

Arbitman, et al., "Backyard cuckoo hashing: Constant worst-case operations with a succinct representation", In Proceedings of 51th Annual IEEE Symposium on Foundations of Computer Science, Oct. 23, 2010, 34 pages.

Albrecht, et al., "On the concrete hardness of learning with errors", In Journal of Mathematical Cryptology, vol. 9, Issue 3, Oct. 1, 2015, pp. 1-40.

Bradley, et al., "Bounded Size-Hiding Private Set Intersection", In Journal of Cryptology ePrint Archive: Report 2016/657, 2016, 20 pages.

Brakerski, et al., "Packed Ciphertexts in LWE-based Homomorphic Encryption", In Proceedings of 16th International Conference on Practice and Theory in Public-Key Cryptography, Feb. 26, 2013, pp. 1-12.

Brakerski, et al., "(Leveled) fully homomorphic encryption without bootstrapping", In Proceedings of the 3rd Innovations in Theoretical Computer Science Conference, Jan. 8, 2012, pp. 309-325.

Bos, et al., "Improved security for a ring-based fully homomorphic encryption scheme", In Proceedings of the 14th IMA International Conference on Cryptography and Coding—vol. 8308, Dec. 17, 2013, 30 pages.

Brakerski, et al., "Efficient Fully Homomorphic Encryption from (Standard) LWE", In SIAM Journal on Computing, vol. 43, Issue 2, Apr. 29, 2014, 43 pages.

Costache, et al., "Which Ring Based Somewhat Homomorphic Encryption Scheme is Best?", In Proceedings of Cryptographers' Track at the RSA Conference, Feb. 29, 2016, 54 pages.

Dong, et al., "When Private Set Intersection Meets Big Data: An Efficient and Scalable Protocol", In Journal of Cryptology ePrint Archive: Report 2013/515, 2013, pp. 1-29.

Dietzfelbinger, et al., "Tight thresholds for cuckoo hashing via XORSAT", In Proceedings of 37th International Colloquium Automata, Languages and Programming, Jul. 6, 2010, pp. 1-36.

Devroye, et al., "Cuckoo hashing: Further analysis", In Journal of Information Processing Letters, vol. 86, Issue 4, May 31, 2003, pp. 215-219.

Ducas, et al., "Sanitization of FHE ciphertexts", In Proceedings of Annual International Conference on the Theory and Applications of Cryptographic Techniques, May 8, 2016, 19 pages.

Dachman-Soled, et al., "Efficient robust private set intersection", In Proceedings of the 7th International Conference on Applied Cryptography and Network Security, Jun. 2, 2009, pp. 125-142.

Freedman, et al., "Efficient Set Intersection with Simulation-Based Security", In Journal of Cryptology, Sep. 4, 2014, pp. 1-35.

Frieze, et al., "An Analysis of Random-Walk Cuckoo Hashing", In Proceedings of the 12th International Workshop and 13th International Workshop on Approximation, Randomization, and Combinatorial Optimization. Algorithms and Techniques, Aug. 21, 2009, pp. 1-18.

Freedman, et al., "Efficient Private Matching and Set Intersection", In Proceedings of International conference on the theory and applications of cryptographic techniques, May 2, 2004, 18 pages.

Fotakis, et al., "Space Efficient Hash Tables with Worst Case Constant Access Time", In Proceedings of the 20th Annual Symposium on Theoretical Aspects of Computer Science, Feb. 27, 2003, 12 pages.

Fan, et al., "Somewhat Practical Fully Homomorphic Encryption", In Journal of Cryptology ePrint Archive: Report 2012/144, 2012, pp. 1-19.

Dowlin, et al., "CryptoNets: Applying neural networks to encrypted data with high throughput and accuracy", In Proceedings of the 33nd International Conference on Machine Learning, Jun. 19, 2016, pp. 1-10.

Gentry, Craig, "Fully homomorphic encryption using ideal lattices", In Proceedings of the forty-first annual ACM symposium on Theory of computing, vol. 9, May 31, 2009, pp. 169-178.

Gentry, et al., "Homomorphic Evaluation of the AES Circuit", In Proceedings of the 32nd Annual Cryptology Conference on Advances in Cryptology, Aug. 22, 2012, 18 pages.

Gentry, et al., "I-Hop Homomorphic Encryption and Rerandomizable Yao Circuits", In Proceedings of the 30th annual conference on Advances in cryptology, Aug. 15, 2010, 18 pages.

Gentry, et al., "Homomorphic Encryption from Learning with Errors: Conceptually-Simpler, Asymptotically-Faster, Attribute-Based", In Proceedings of Advances in Cryptology, vol. 1, Aug. 18, 2013, pp. 1-25.

Huang, et al., "Private Set Intersection: Are Garbled Circuits Better than Custom Protocols?", In Proceedings of 19th Network and Distributed Security Symposium, Feb. 5, 2012, 15 pages.

Huberman, et al., "Enhancing privacy and trust in electronic communities", In Proceedings of the 1st ACM conference on Electronic commerce, Nov. 3, 1999, 9 pages.

Hazay, et al., "Efficient Protocols for Set Intersection and Pattern Matching with Security against Malicious and Covert Adversaries", In Proceedings of the 5th conference on Theory of cryptography, Mar. 19, 2008, pp. 1-33.

Hazay, et al., "Efficient Set Operations in the Presence of Malicious Adversaries", In Proceedings of International Workshop on Public Key Cryptography, May 26, 2010, pp. 1-46.

Ishai, et al., "Extending Oblivious Transfers Efficiently", In Proceedings of Annual International Cryptology Conference, Aug. 17, 2003, pp. 145-161.

Kolesnikov, et al., "Efficient Batched Oblivious PRF with Applications to Private Set Intersection", In Journal of Cryptology ePrint Archive: Report 2016/799, Aug. 20, 2016, pp. 1-19.

Kamara, et al., "Scaling private set intersection to billion-element sets", In Proceedings of International Conference on Financial Cryptography and Data Security, Mar. 3, 2014, 14 pages.

Lamb/EK, Mikkel, "Breaking and Fixing Private Set Intersection Protocols", In Journal of Cryptology ePrint Archive: Report 2016/665, Jun. 2016, 71 pages.

Lopez-Alt, et al., "On-the-Fly Multiparty Computation on the Cloud via Multikey Fully Homomorphic Encryption", In Proceedings of the forty-fourth annual ACM symposium on Theory of computing, May 19, 2012, pp. 1219-1234.

(56) References Cited

OTHER PUBLICATIONS

Laine et al., "Simple Encrypted Arithmetic Library—SEAL v2.1", In Technical Report of MSR-TR-2016-52, Sep. 6, 2016, 27 pages.
Lindell, Yehuda, "How to Simulate It—A Tutorial on the Simulation Proof Technique", In Journal of Cryptology ePrint Archive, Report 2016/046, May 24, 2016, pp. 1-64.
Lyubashevsky, et al., "On ideal lattices and learning with errors over rings", In Proceedings of Annual International Conference on the Theory and Applications of Cryptographic Techniques, May 30, 2010, pp. 1-34.
Marlinspike, Moxie, "The Difficulty of Private Contact Discovery", https://whispersystems.org/blog/contact-discovery/, Published on: Jan. 3, 2014, 3 pages.
Meadows, Catherine, "A more efficient cryptographic matchmaking protocol for use in the absence of a continuously available third party", In Proceedings of IEEE Symposium on Security and Privacy, Apr. 7, 1986, pp. 134-137.
Lauter, et al., "Can homomorphic encryption be practical?", In Proceedings of the 3rd ACM workshop on Cloud computing security workshop, Oct. 21, 2011, pp. 113-124.
Orru, et al., "Actively Secure 1-out-of-N OT Extension with Application to Private Set Intersection", In Journal of Cryptology ePrint Archive: Report 2016/933, Nov. 2016, pp. 1-27.
Pagh, et al., "Cuckoo Hashing", In Journal of European Symposium on Algorithms, Aug. 2001, pp. 121-133.
Pinkas, et al., "Phasing: Private set intersection using permutation-based hashing", In Proceedings of the 24th USENIX Conference on Security Symposium, Aug. 12, 2015, pp. 515-530.
Pinkas, et al., "Faster private set intersection based on OT extension", In Journal of IACR Cryptology ePrint Archive, 2014, pp. 1-21.
Pinkas, et al., "Scalable private set intersection based on OT extension", In Journal of IACR Cryptology ePrint Archive, 2016, pp. 1-35.
Rivest, et al., "On data banks and privacy homomorphisms", In Proceedings of Foundations of secure computation, vol. 4, Issue 11, Oct. 16, 1978, pp. 169-180.
Rindal, et al., "Improved Private Set Intersection against Malicious Adversaries", In Journal of IACR Cryptology ePrint Archive, 2016, pp. 1-18.
Raab, et al., ""Balls into Bins"—A Simple and Tight Analysis", In Proceedings of the Second International Workshop on Randomization and Approximation Techniques in Computer Science, Oct. 8, 1998, pp. 159-170.
Smart, et al., "Fully homomorphic SIMD operations", In Journal of Designs, codes and cryptography vol. 71, Issue 1, Apr. 2014, pp. 1-19.
Bourse, et al., "FHE Circuit Privacy Almost for Free", In Proceedings of Annual Cryptology Conference, Aug. 14, 2016, 22 pages.
Brakerski, Zvika, "Fully homomorphic encryption without modulus switching from classical GapSVP", In Proceedings of the 32nd Annual Cryptology Conference on Advances in Cryptology, vol. 7417, Aug. 19, 2012, 20 pages.
Buchmann, et al., "Creating cryptographic challenges using multi-party computation: The LWE challenge", In Proceedings of the 3rd ACM International Workshop on ASIA Public-Key Cryptography, May 30, 2016, pp. 11-20.
Crandall, et al., "Prime numbers: a computational perspective", In Publication of Springer, Apr. 7, 2006, 604 pages.
Crockett, et al., "Challenges for Ring-LWE", In Journal of IACR Cryptology ePrint Archive, 2016, pp. 1-38.
Dowlin, et al., "Manual for Using Homomorphic Encryption for Bioinformatics", In TechReport of MSR-TR-2015-87, Nov. 13, 2015, pp. 1-13.
Ducas, et al., "Ring-LWE in Polynomial Rings", In Proceedings of 15th International Conference on Practice and Theory in Public Key Cryptography, May 21, 2012, 23 pages.
Goldwasser, et al., "Robustness of the learning with errors assumption", In Journal of Innovations in Computer Science, Jan. 1, 2010, pp. 230-240.
Harvey, David, "Faster arithmetic for number-theoretic transforms", In Journal of Symbolic Computation, vol. 60, Jan. 31, 2014, pp. 1-9.
Laine, et al., "Simple encrypted arithmetic library—seal (v2.0)", In Technical Report of MSR-TR-2016-52, Sep. 6, 2016, 24 pages.
LePoint, et al., "A comparison of the homomorphic encryption schemes FV and YASHE", In Proceedings of 7th International Conference on Cryptology in Africa, May 28, 2014, 18 pages.
Longa, et al., "Speeding up the Number Theoretic Transform for Faster Ideal Lattice-Based Cryptography", In Proceedings of 15th International Conference, CANS, Nov. 14, 2016, pp. 1-18.
Lyubashevsky, et al., "A Toolkit for Ring-LWE Cryptography", In Proceedings of 32nd Annual International Conference on the Theory and Applications of Cryptographic Techniques, May 26, 2013, 19 pages.
Regev, Oded, "On lattices, learning with errors, random linear codes, and cryptography", In Proceedings of the thirty-seventh annual ACM symposium on Theory of computing, May 22, 2005, pp. 84-93.

\* cited by examiner

PRIVATE SET INTERSECTION ENCRYPTION TECHNIQUES

BACKGROUND

The Internet has revolutionized the way we share information. For instance, the various personal and professional social media sites on the Internet allow users to seamlessly connect to friends and colleagues to share personal and professional experiences. In another example, individuals and businesses often use the Internet to facilitate sharing a wide range of information and data. While current digital technologies simplify the sharing of information, the information may be personal or sensitive.

A comparison of two sets of data elements may be beneficial before two entities decide to share personal or sensitive information. The comparison of the two sets of data elements may involve computing the intersection of the two sets of data elements. For example, users of a social media site may want to determine who their common friends or acquaintances are before accepting a follow or friend request. In another example, two business entities may wish to determine the number or identities of common customers before entering into a business relationship. In yet another example, a medical entity may need to perform data analysis on two sets of data elements to determine an intersection of the data elements, which may include patient related information, without violating patient privacy.

Private set intersection may enable entities to compute the intersection of data elements included within their respective sets of data elements without disclosing any information about the data elements contained in the sets of data elements. For example, in a client/server environment, the client may ascertain the intersection of elements within the sets of data elements, while the server does not ascertain the intersection of data elements within the sets of data elements. Private set intersection has numerous real-world applications including social media contact sharing and privacy preserving data mining, such as those performed by medical and/or government entities. More specifically, private set intersection allows two entities $E_1$ and $E_2$ to find the intersection of two sets of data elements $S_1$ and $S_2$ without having to disclose the sets of data elements to each other. In other words, using private set intersection the two entities $E_1$ and $E_2$ may find the intersection $I=S_1 \cap S_2$ of their sets without learning information about the other party's set of data elements beyond the intersection I.

While conventional private set intersection techniques allow entities to find the intersection of sets of data elements, those conventional private set intersection techniques have some inherent inefficiencies. For example, conventional private set intersection techniques may require the involved entities to exchange a large amount of ciphertext information related to the sets of data elements. This exchange of the large amount of ciphertext information may impede speed and efficiency in calculating the intersection of the sets of data elements and disseminating the intersection of the sets of data elements. Furthermore, conventional private set intersection techniques may not efficiently encrypt and communicate data strings that exceed 32 bits. Specifically, conventional private set intersection techniques that encrypt data strings that exceed the 32 bits create excessively large ciphertext strings that require enormous communication bandwidth and/or storage at the receiver of the ciphertext strings. Therefore, efficient techniques for providing private set intersection remain elusive. Specifically, some conventional private set intersection techniques create large encrypted payloads that are inefficient to transfer and consume significant processing resources.

It is with respect to these and other considerations that the disclosure made herein is presented.

SUMMARY

The described techniques provide techniques related to private set intersection using homomorphic encryption. In some configurations, the private set intersection techniques segment data into at least a plurality of strings. The strings are encrypted individually or collectively at a client computing device and communicated to a server computing device. The server computing device creates a vector using at least the plurality of encrypted strings. Furthermore, the server generates a ciphertext vector by multiplying the vector with a matrix. In some implementations, the matrix is invertible. The ciphertext vector may be decrypted to determine if a plurality of strings stored in the computing server device match a plurality of strings stored in the client computing device, while only revealing data strings that are common between the server computing device and the client computing device.

In the problem of private set intersection, at least one entity of a plurality of entities wants to learn the intersection of their data sets without revealing to each other the information about their data sets beyond the intersection. Private set intersection is a fundamental problem in security and privacy that comes up in many different contexts. Consider, for example, the case of two or more organizations that wish to obtain a list of common customers for data mining purposes, or government agency that wants to learn whether anyone on its no-fly list is on a flight's passenger list. Private set intersection has found applications in a wide range of settings such as genomic computation, location-based services, and collaborative botnet detection.

The described private set intersection techniques enable entities to determine common data strings in their respective data sets. The private set intersection techniques described herein allow those common data strings to be shareable between the entities, while maintaining the secrecy of other data strings stored in their respective data sets. Furthermore, the private set intersection techniques described herein do not require the use of enormous communication bandwidth and/or storage to accommodate the ciphertexts generated by the disclosed private set intersection techniques.

In some exemplary implementations, an entity, such as a user of a first social media site, may wish to communicate with another entity, such as second social media site, to determine if contacts associated with the second social media site are in common with the user's contacts. The user uses a computing device to homomorphically encrypt some or all of the data associated with the user's contacts. The encrypted data, in ciphertext format, may be communicated to the second social media site using the computing device. In some implementations, the encrypted data comprises a first encrypted string of data and a second encrypted string of data. There may be a plurality of the encrypted strings of data, and each of the plurality of encrypted strings of data may form an encrypted data set. There may be a plurality of encrypted data sets.

The computing device associated with the second social media site may receive the encrypted data comprising the first encrypted string of data and the second encrypted string of data. The social media site retrieves from its associated computing device user contact data. The retrieved user contact data may be comprised as a first string of data and a second string of data. The social media site computes a first ciphertext value using the first encrypted string of data and the first string of data. Furthermore, the social media site computes a second ciphertext value using the second encrypted string of data and the second string of data. In some implementations, the first string of data and the second string of data are in plain text format (i.e., not encrypted).

The first ciphertext value and the second ciphertext value may be formatted as a vector by the computing device of the second social media site. The computing device of the second social media site generates a matrix that includes a plurality of numbers chosen randomly. In some implementations, the generated matrix is an invertible matrix. The computing device of the second social media site multiplies the matrix with the vector including the first ciphertext value and the second ciphertext value. The multiplication provides a ciphertext vector.

The ciphertext vector may be communicated by the second social media site to the first social media site. The ciphertext vector may be decrypted using a homomorphic encryption secret key generated and retained by the first social media site. The ciphertext vector includes ciphertext representing only a plurality of 0 s or ciphertext representing one or more values other than 0. When the ciphertext vector includes only ciphertext representing a plurality of 0 s, the first encrypted string of data is equal to the first string of data and the second encrypted string of data is equal to the second string of data. When the ciphertext vector includes ciphertext representing one or more values other than 0, at least the first encrypted string of data is not equal to the first string of data and/or the second encrypted string of data is not equal to the second string of data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
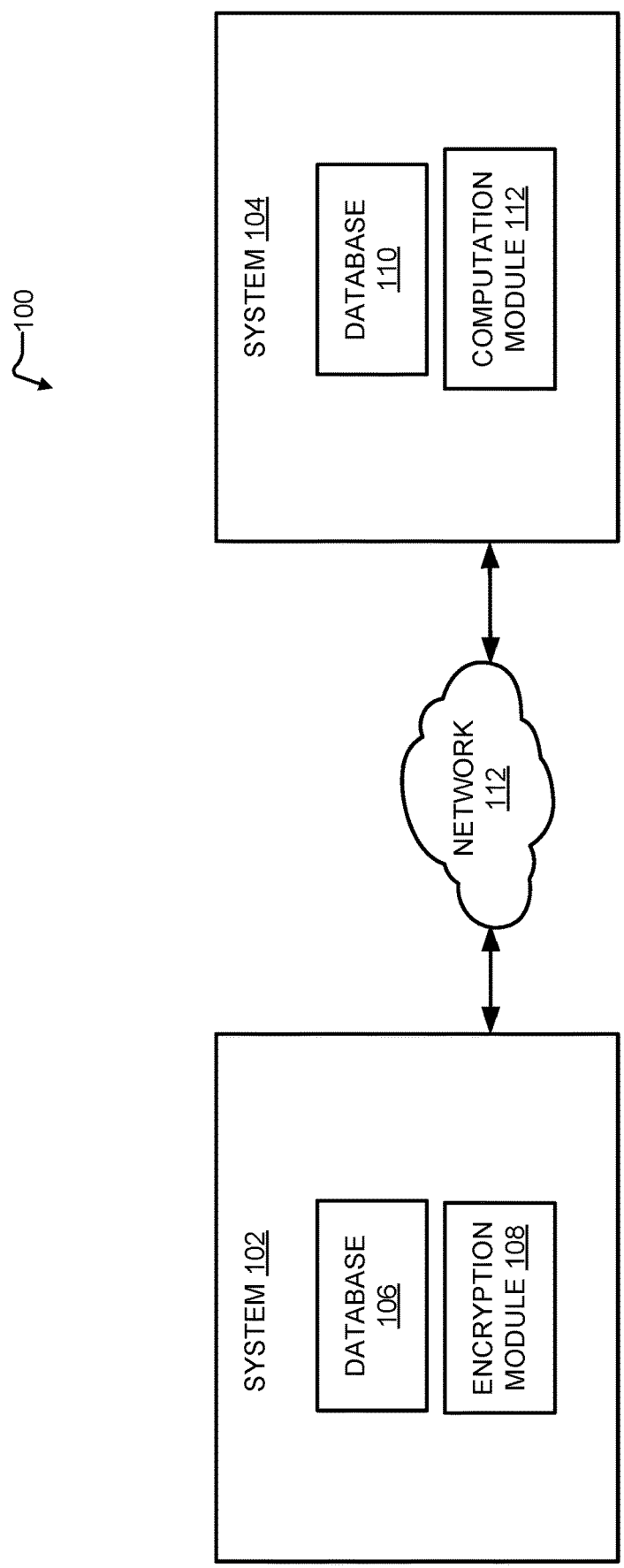
FIG. 1 is a diagram illustrating an example operating environment in which one or more systems can operate to share data, facilitated using the disclosed private set intersection techniques.

The disclosure herein relates to private set intersection techniques. The described private set intersection techniques enable entities to determine common data strings in their respective data sets. The private set intersection techniques described herein allow those common data strings to be shareable between the entities, while maintaining the secrecy of other data strings stored in their respective data sets. Furthermore, the private set intersection techniques described herein do not require the use of enormous communication bandwidth and/or storage to accommodate the ciphertexts generated by the disclosed private set intersection techniques.

In some exemplary implementations, an entity, such as a user of a first social media site, may wish to communicate with another entity, such as second social media site, to determine if contacts associated with the second social media site are in common with the user's contacts. The user uses a computing device to homomorphically encrypt some or all of the data associated with the user's contacts. The encrypted data, in ciphertext format, may be communicated to the second social media site using the computing device. In some implementations, the encrypted data comprises a first encrypted string of data and a second encrypted string of data. There may be a plurality of the encrypted strings of data, and each of the plurality of encrypted strings of data may form an encrypted data set. There may be a plurality of encrypted data sets.

The computing device associated with the second social media site may receive the encrypted data comprising the first encrypted string of data and the second encrypted string of data. The social media site retrieves from its associated computing device user contact data. The retrieved user contact data may be comprised as a first string of data and a second string of data. The social media site computes a first ciphertext value using the first encrypted string of data and the first string of data. Furthermore, the social media site computes a second ciphertext value using the second encrypted string of data and the second string of data. In some implementations, the first string of data and the second string of data are in plain text format (i.e., not encrypted).

The first ciphertext value and the second ciphertext value may be formatted as a vector by the computing device of the second social media site. The computing device of the second social media site generates a matrix that includes a plurality of numbers chosen randomly. In some implementations, the generated matrix is an invertible matrix. The computing device of the second social media site multiplies the matrix with the vector including the first ciphertext value and the second ciphertext value. The multiplication provides a ciphertext vector.

The ciphertext vector may be communicated by the second social media site to the first social media site. The ciphertext vector may be decrypted using a homomorphic encryption secret key generated and retained by the first social media site. The ciphertext vector includes ciphertext representing only a plurality of 0 s or ciphertext representing one or more values other than 0. When the ciphertext vector includes only ciphertext representing a plurality of 0 s, the first encrypted string of data is equal to the first string of data and the second encrypted string of data is equal to the second string of data. When the ciphertext vector includes ciphertext representing one or more values other than 0, at least the first encrypted string of data is not equal to the first string of data and/or the second encrypted string of data is not equal to the second string of data.

FIG. 1 is a diagram illustrating an example operating environment 100 in which one or more systems can operate to privately share data, facilitated using the disclosed private set intersection techniques. FIG. 1 illustrates a system 102 and a system 104. In some implementations, the systems 102 and 104 are each a computing device. For example, the system 102 may be a mobile device, such as a mobile phone or tablet computer, laptop, or desktop computer. The system 104 may be a server computing device, a plurality of server computing devices, or a processing resource in a cloud computing system.

The system 102 may be associated with or belong to an entity $E_1$. The entity $E_1$ may be a user, such as an individual, of the system 102. The system 102 may include a database 106. The database 106 may be stored in one or more storage devices associated with the system 102. The database 106 may store data. For example, in some implementations, the database 106 stores contact information (e.g., names, addresses, phone numbers, and/or email addresses). The database 106 may store other data types in place of the contact information or in addition to the contact information. For example, the database 106 may store patient medical data, aircraft passenger manifests, and/or user information related to an online service or application, for example, a gaming service or application.

The system 102 may include an encryption module 108. In some implementations, the encryption module 108 is to generate encryption keys, such as secret and public keys related to one or more encryption schemes implemented by the encryption module 108. In some implementations, the encryption module 108 implements a homomorphic encryption scheme. Therefore, the encryption module 108 may generate secret keys and public keys in accordance with the homomorphic encryption scheme used by the encryption module 108. In some implementations, the encryption module 108 uses leveled fully homomorphic encryption. In general, the encryption module 108 may use an encryption scheme, such as a homomorphic encryption scheme, that allows for performing certain mathematical operations on encrypted information without the knowledge of or use of the secret key associated with the encryption scheme.

The system 104 may be associated with or belong to an entity $E_2$. The entity $E_2$ may be a user, such as an organization, of the system 104. The system 108 may include a database 110. The database 110 may be stored in one or more storage devices associated with the system 104. The database 110 may store data. For example, in some implementations, the database 110 stores contact information (e.g., names, addresses, phone numbers, and/or email addresses). The database 110 may store other data types in place of the contact information or in addition to the contact information. For example, the database 110 may store patient medical data, aircraft passenger manifests, and/or user information related to an online service or application, for example, a gaming service or application.

The system 102 and the system 104 may be coupled or connected via any type of network 112. The network 112 may represent any type of point-to-point or multipoint coupling mechanism. In some implementations, the network 112 may correspond to a wide area network (e.g., the Internet), a local area network, or combination thereof. The network 112 may include any combination of wireless links, wired links, routers, gateways, etc., as governed by any protocol or combination of protocols.

In some implementations, the database 110 stores a greater amount of data than the database 106. For example, the database 106 may store contact information for a single user of the system 102 or a handful of users of the system 102. In comparison, the database 110 may store contact information for many users of the system 104. For example, the database 110 may store contact information for hundreds of users of the system 104. In some implementations, a user of the system 102 may wish to determine if some or all of the data stored in the database 106 is also stored in the database 110. Therefore, the user of the system 102 may wish to determine the intersection of the data stored in the database 106 and the data stored in the database 110. However, the user the system 102 may wish to maintain the secrecy of the data stored in the database 106. Furthermore, the entity associated with the system 104 may also wish to maintain the secrecy of the data stored in the database 110. In some implementations, each entity of the respective systems 102 and 104 stores private data, and the goal is to collectively compute the intersection of the stored private data without leaking additional information and while ensuring correctness of the intersection.

The system 104 may also include a computation module 112. As is discussed in the following, the computation module 112 may perform computations and operations on encrypted data received at the system 104 and communicated from the system 102.

Figure 2:
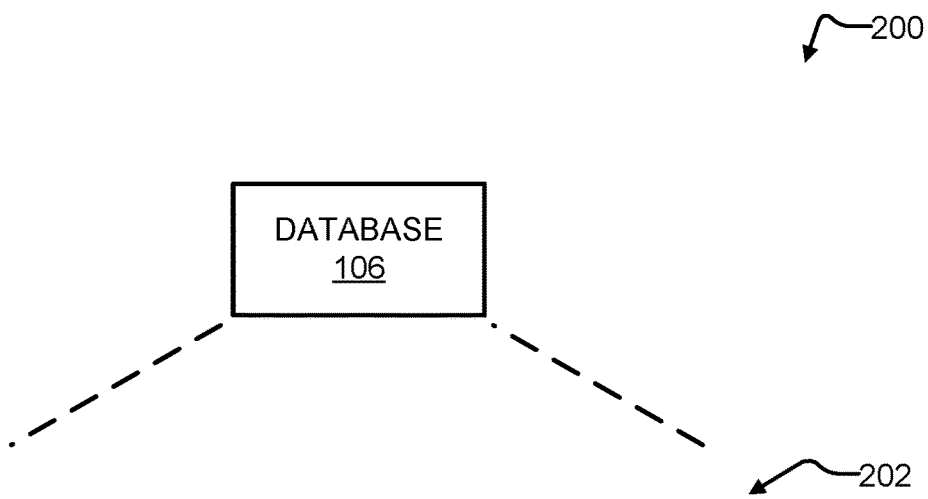
FIG. 2 illustrates exemplary data that may be stored in databases of the example operating environment that includes the one or more systems.
Figure 2:
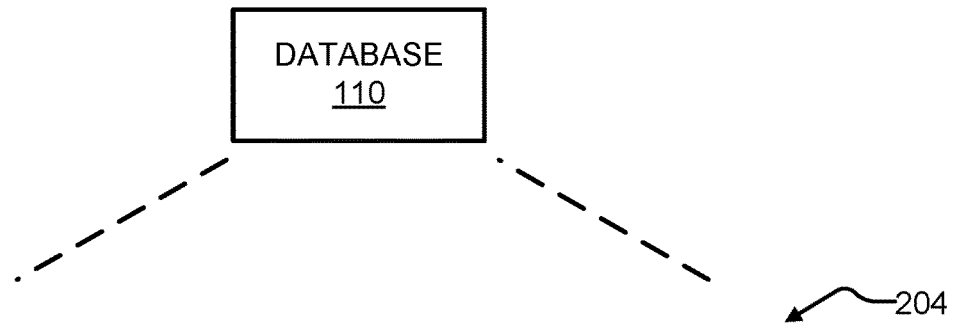

FIG. 2 illustrates exemplary data that may be stored in databases 106 and 110. In FIG. 2, the exemplary data stored in the database 106 is contact information 202. The contact information 202 may include names, phone numbers and email addresses. Other information may also be stored in the database 106. Furthermore, the exemplary data stored in the database 110 is contact information 204. Similarly, the contact information 204 may include names, phone numbers and email addresses. Other information may also be stored in the database 110. Furthermore, both databases 106 and 110 may store additional contact information greater than the number of contact information illustrated in FIG. 2. In some implementations, the database 110 stores contact information that exceeds the contact information stored in the database 106.

In some implementations, the system 102 segments the contact information 202 stored in the database 106 to provide strings of data. For example, entry number 1 of the database 106 may be segmented into three strings of data, $C^1$, $C^2$ and $C^3$. Similarly, entry number 2 of the database 106 may be segmented into three strings of data, $D^1$, $D^2$ and $D^3$. The additional contact information 202 stored in the database 106 may be segmented in the same fashion as described in the foregoing. The contact information 202 stored in the database 106 may be unencrypted plaintext contact information or data.

In some implementations, the system 104 also segments the contact information 204 stored in the database 110. For example, entry number 1 of the database 110 may be segmented into three strings of data, $F^1$, $F^2$ and $F^3$. Similarly, entry number 2 of the database 110 may be segmented into three strings of data, $G^1$, $G^2$ and $G^3$. The additional contact information 202 stored in the database 110 may be segmented in the same fashion as described in the foregoing. The contact information stored in the database 110 may be unencrypted plaintext contact information or data.

The system 102 may use the encryption module 108 to generate a homomorphic secret key and a homomorphic public-key. The system 102 may use the homomorphic secret key to encrypt some or all of the data contained in the database 106. In some implementations, the system 102 uses the encryption module 108 and the homomorphic secret key to encrypt each of the strings of data (e.g., strings of data, $C^1$, $C^2$ and $C^3$) to generate encrypted strings of data (e.g., $enc(C^1)$, $enc(C^2)$ and $enc(C^3)$). The system 102 communicates the encrypted strings of data to the system 104. The system 102 may communicate the encrypted strings of data is a batch of encrypted strings of data.

The system 104 may receive the encrypted strings of data. For example, the system 104 may receive encrypted strings of data including encrypted strings of data ($enc(C^1)$, $enc(C^2)$ and $enc(C^3)$), ($enc(D^1)$, $enc(D^2)$ and $enc(D^3)$) and ($enc(E^1)$, $enc(E^2)$ and $enc(E^3)$). The encrypted strings of data may be received by the system 104 as a batch of encrypted strings of data including the encrypted strings of data ($enc(C^1)$, $enc(C^2)$ and $enc(C^3)$), ($enc(D^1)$, $enc(D^2)$ and $enc(D^3)$) and ($enc(E^1)$, $enc(E^2)$ and $enc(E^3)$).

The system 104 may compute ciphertext values using the receive encrypted strings of data and the contact information stored in the database 110. For example, the system 104 may use the equation (enc(y)–z) to generate a plurality of ciphertext values, where enc(y) is one of the encrypted strings of data received from the system 102 and z is one of the plaintext strings of data stored in the database 110. For example, the system 104 may compute a first ciphertext value $X_1$ using equation ($enc(D^1)-H^1$) and a second ciphertext value $X_2$ using equation ($enc(D^2)-H^2$). Additional ciphertext values may also be generated by the system 104. In particular, for all plaintext strings of data stored in the database 110, the equation may be generalized as (enc(y)–$z^1$)*(enc(y)–$z^2$)* ... (enc(y)–$z^n$), where z1, z2, . . . , where $z^n$ represents the entire collection of plaintext strings of data stored in database 110. However, for the sake of conciseness, such additionally generated ciphertext values are not illustrated and discussed in this disclosure. In general, the computation module 112 may perform the computations described in the foregoing.

The first ciphertext value $X_1$ and the second ciphertext value $X_2$, as well as any additionally generated ciphertext values, are placed in vector format by the computation module 112. The vector including the first and second ciphertext values $X_1$ and $X_2$ is at least a V×1 vector, where V is the number of rows in the vector, and in this case V=2.

The computation module 112 may generate a matrix that includes random numbers and corresponds to the size of the vector including the ciphertext values. In the described implementation, the generated matrix is an M×2 matrix, where M is the number of rows in the matrix. In some implementations, M and V are equal. Furthermore, in some implementations, the matrix that includes random numbers is an invertible matrix.

The computation module 112 may multiply the vector including the first ciphertext value $X_1$ and the second ciphertext value $X_2$ with the matrix that includes random numbers. The result of the multiplication is a ciphertext vector that includes ciphertext representing a plurality of numbers. In some implementations, the ciphertext included in the ciphertext vector will be ciphertext representing only a plurality of 0 s or ciphertext representing one or more values other than 0. Specifically, according to the described embodiment, the vector and matrix multiplication provides:

$$\begin{bmatrix} a & b \\ c & d \end{bmatrix} \begin{pmatrix} X_1 \\ X_2 \end{pmatrix} = \begin{pmatrix} aX_1 + bX_2 \\ cX_1 + dX_2 \end{pmatrix} = \begin{pmatrix} d_1 \\ d_2 \end{pmatrix},$$

where a-d are the random numbers, $$\begin{pmatrix} X_1 \\ X_2 \end{pmatrix}$$

is the vector including the ciphertext values $X_1$ and $X_2$ and $$\begin{pmatrix} aX_1 + bX_2 \\ cX_1 + dX_2 \end{pmatrix}$$

is the calculated ciphertext vector that includes ciphertext representing a plurality numbers $$\begin{pmatrix} d_1 \\ d_2 \end{pmatrix},$$

resulting from the calculation of $$\begin{pmatrix} aX_1 + bX_2 \\ cX_1 + dX_2 \end{pmatrix}.$$

The ciphertext vector including the plurality numbers $$\begin{pmatrix} d_1 \\ d_2 \end{pmatrix}$$

may be communicated to the system 102 by the system 104. The system 102 receives the ciphertext vector including the plurality of numbers $$\begin{pmatrix} d_1 \\ d_2 \end{pmatrix}$$

and uses the secret key generated by the encryption module 108 to decrypt ciphertext representing the plurality of numbers $$\begin{pmatrix} d_1 \\ d_2 \end{pmatrix}$$

contained in the ciphertext vector. When $d_1=0$ and $d_2=0$, then both $D^1$ and $H^1$ match, and $D^2$ and $H^2$ match. When $d_1 \neq 0$ and/or $d_2 \neq 0$ the system 102 may conclude that $D^1$ and $H^1$ do not match, and $D^2$ and $H^2$ also do not match. In some implementations, each of $d_1$ and/or $d_2$ may be a non-zero modulo T, where T is a number, such as a prime number. When $d_1 \neq$ non-zero modulo T and/or $d_2 \neq$ non-zero modulo T the system 102 may conclude that $D^1$ and $H^1$ do not match, and $D^2$ and $H^2$ also do not match.

Figure 3:
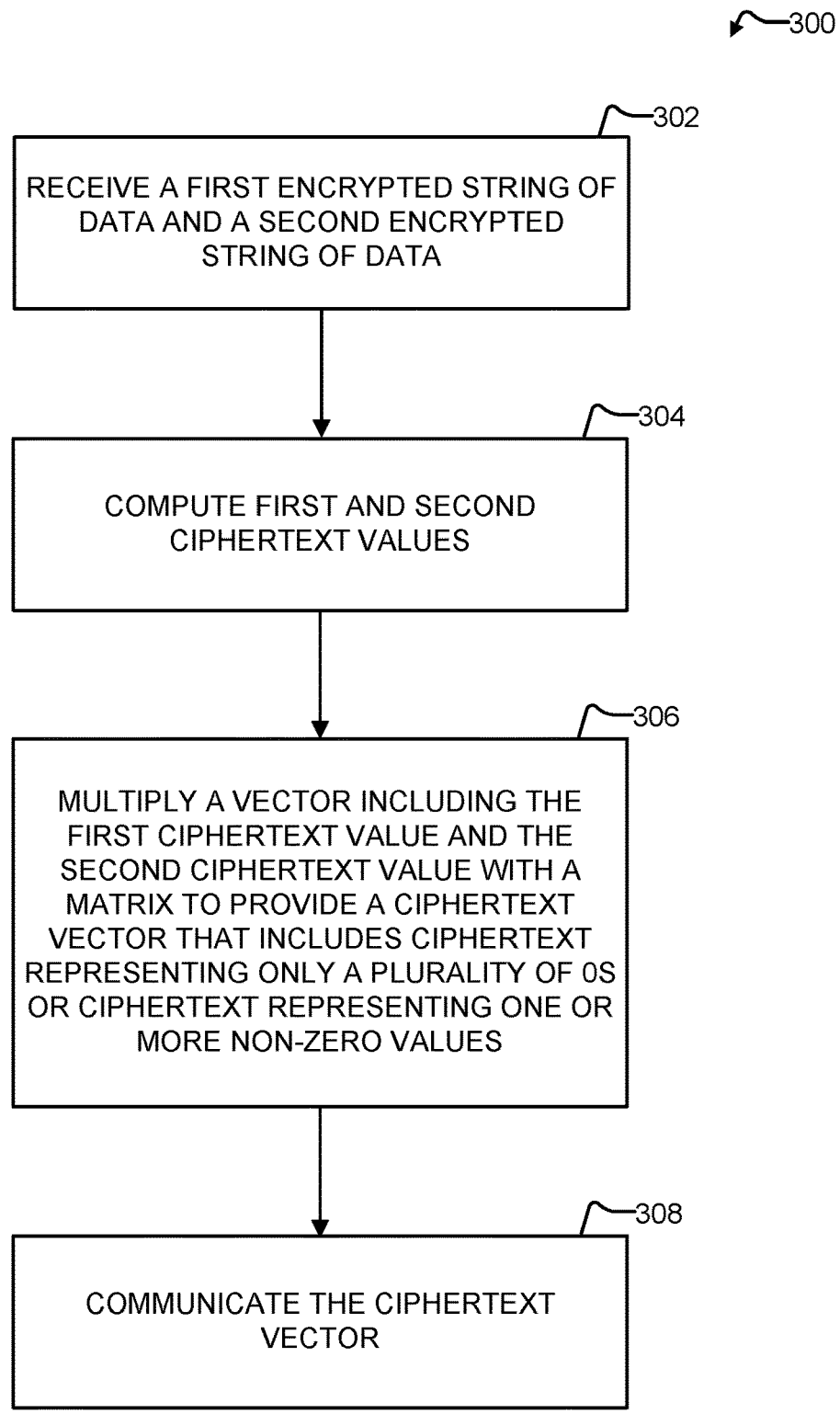
FIG. 3 is a flow diagram of a method of providing private set intersection techniques using homomorphic encryption, according to the techniques and technologies disclosed herein.
Figure 4:
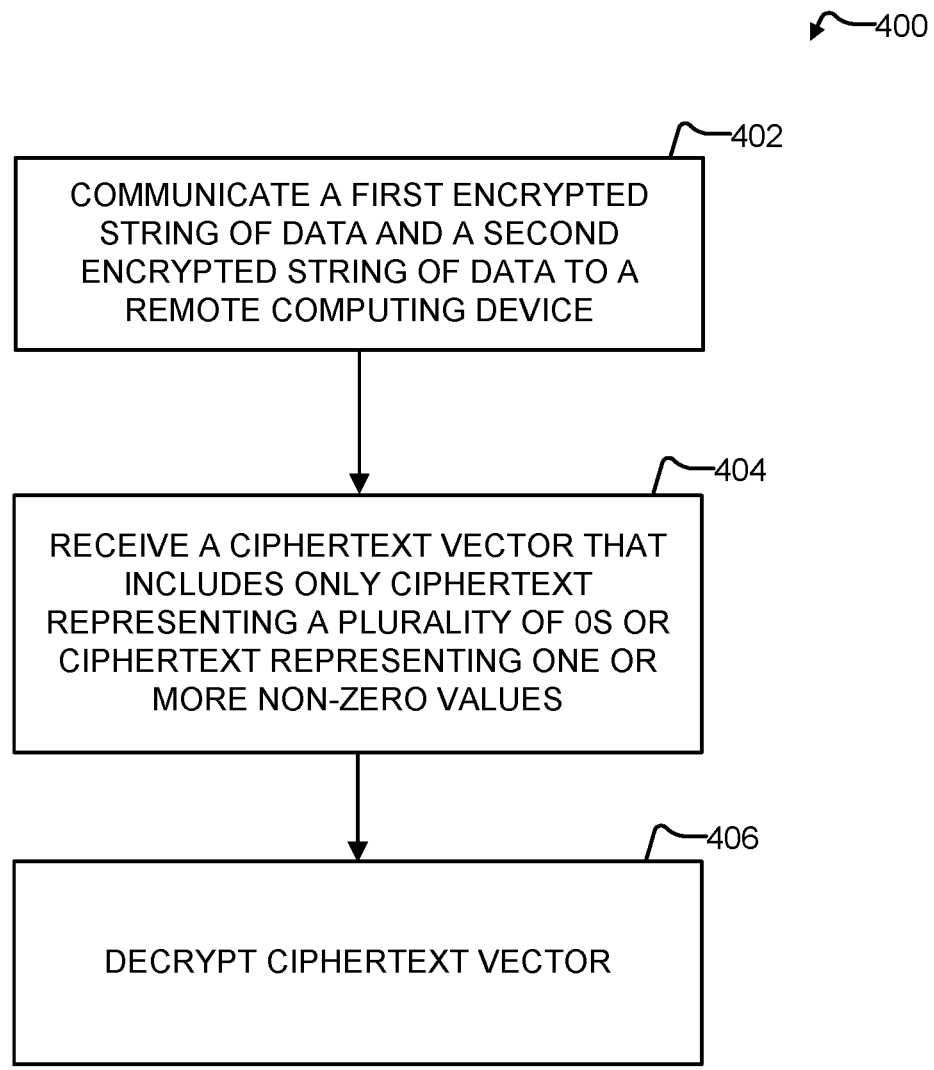
FIG. 4 is a flow diagram of another method of providing private set intersection techniques using homomorphic encryption, according to the techniques and technologies disclosed herein.

Hereinafter, a more detailed discussion of the operation of the systems and components described above is provided with reference to several flow diagrams. As illustrated in FIG. 3 and FIG. 4, aspects of methods 300 and 400 related to private set intersection techniques using homomorphic encryption. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the methods 300 and 400 are described herein as being implemented, at least in part, by system components, which can comprise an application, component and/or a circuit. In some configurations, the system components include a dynamically linked library (DLL), a statically linked library, functionality produced by an application programming interface (API), a compiled program, an interpreted program, a script or any other executable set of instructions. Data, such as the data stored in the databases 106 and/or 110, can be stored in a data structure in one or more memory components. Data can be retrieved from the data structure by addressing links or references to the data structure.

Although the following illustration refers to the components of FIG. 1 and FIG. 2, it can be appreciated that the operations of the 300 400 may be also implemented in many other ways. For example, the methods 300 and 400 may be implemented, at least in part, by a processor of another remote computer or a local circuit. In addition, one or more of the operations of the methods 300 and 400 may alternatively or additionally be implemented, at least in part, by a chipset working alone or in conjunction with other software modules. Any service, circuit or application suitable for providing the techniques disclosed herein can be used in operations described herein.

FIG. 3 is a flow diagram of a method 300 of providing private set intersection techniques using homomorphic encryption. Specifically, the method 300 may generally be performed by the system 104 and/or one or more computing devices associated with the system 104.

As illustrated in FIG. 3, at block 302, the system 104 may receive a first encrypted string of data and a second encrypted string of data. Each of the first encrypted string of data and the second encrypted string of data may have a length of 32 bits. Alternatively, each of the first encrypted string of data and the second encrypted string of data may have a length that is greater than the 32 bits.

In some implementations, the first encrypted string of data and the second encrypted string of data include contact information 202, in encrypted format, that is stored in the database 106 of the system 102. For example, the system 104 may receive encrypted strings of data including encrypted strings of data (enc($C^1$), enc($C^2$) and enc($C^3$)), (enc($D^1$), enc($D^2$) and enc($D^3$)) and (enc($E^1$), enc($E^2$) and enc($E^3$)). The encrypted strings of data may be received by the system 104 as a batch of encrypted strings of data including the encrypted strings of data (enc($C^1$), enc($C^2$) and enc($C^3$)), (enc($D^1$), enc($D^2$) and enc($D^3$)) and (enc($E^1$), enc($E^2$) and enc($E^3$)). In some implementations, the first encrypted string of data and the second encrypted string of data received by the system 104 includes encrypted medical data or encrypted flight passenger manifest data, or the like.

At block 304, the system 104 computes first and second ciphertext values (e.g., the first ciphertext value $X_1$ and the second ciphertext value $X_2$). The first ciphertext value is computed using the first encrypted string of data and a first string of data that is retrieved from the database 110. The second ciphertext value is computed using the second encrypted string of data and a second string of data that is retrieved from the database 110. In some implementations, the database 110 of the system 104 includes stored in a segmented contact information 204. For example, entry number 1 of the database 110 may be segmented into three strings of data, $F^1$, $F^2$ and $F^3$. Similarly, entry number 2 of the database 110 may be segmented into three strings of data, $G^1$, $G^2$ and $G^3$. The additional contact information 202 stored in the database 110 may be segmented in the same fashion as described in the foregoing. The contact information stored in the database 110 may be unencrypted plaintext contact information or data. In some implementations, the database 110 of the system 104 includes segmented medical data or segmented no-fly passenger data, or the like.

The system 104 may use the equation (enc(y)−z) to generate a plurality of ciphertext values, where enc(y) is one of the encrypted strings of data received from the system 102 and z is one of the plaintext strings of data stored in the database 110. For example, the system 104 may compute the first ciphertext value $X_1$ using equation (enc($D^1$)−$H^1$) and the second ciphertext value $X_2$ using equation (enc($D^2$)−$H^2$). Additional ciphertext values may also be generated by the system 104. The computation module 112 may perform the computations described in the foregoing.

At block 306, the system 104 multiplies a vector including the first ciphertext value and the second ciphertext value with a matrix to provide a ciphertext vector that includes ciphertext representing only a plurality of 0 s or ciphertext representing one or more values other than 0.

For example, the first ciphertext value $X_1$ and the second ciphertext value $X_2$, as well as any additionally generated ciphertext values, may be placed in vector format by the computation module 112. The vector including the first and second ciphertext values is at least a V×1 vector, where V is the number of rows in the vector, and in this case V=2.

The computation module 112 may generate a matrix that includes random numbers and corresponds to the size of the vector including the ciphertext values. In the above described implementation, the generated matrix is an M×2 matrix, where M is the number of rows in the matrix. In some implementations, M and V are equal. Furthermore, in some implementations, the matrix that includes random numbers is an invertible matrix. In general, the matrix is an M× V, wherein M is equal to V.

The computation module 112 may multiply the vector including the first ciphertext value $X_1$ and the second ciphertext value $X_2$ with the matrix that includes random numbers. The result of the multiplication is a ciphertext vector that includes ciphertext representing a plurality of numbers. In some implementations, the ciphertext included in the ciphertext vector will be ciphertext representing only a plurality of 0 s or ciphertext representing one or more values other than 0. Specifically, according to the described embodiments, the vector and matrix multiplication provides:

$$\begin{bmatrix} a & b \\ c & d \end{bmatrix} \begin{pmatrix} X_1 \\ X_2 \end{pmatrix} = \begin{pmatrix} aX_1 + bX_2 \\ cX_1 + dX_2 \end{pmatrix} = \begin{pmatrix} d_1 \\ d_2 \end{pmatrix},$$

where a-d are the random numbers, $$\begin{pmatrix} X_1 \\ X_2 \end{pmatrix}$$

is the vector including the ciphertext values $X_1$ and $X_2$ and $$\begin{pmatrix} aX_1 + bX_2 \\ cX_1 + dX_2 \end{pmatrix}$$

is the calculated ciphertext vector that includes ciphertext represented by a plurality numbers $$\begin{pmatrix} d_1 \\ d_2 \end{pmatrix},$$

resulting from the calculation of $$\begin{pmatrix} aX_1 + bX_2 \\ cX_1 + dX_2 \end{pmatrix}.$$

At block 308, the ciphertext vector $$\begin{pmatrix} d_1 \\ d_2 \end{pmatrix}$$

is communicated to the system 102 from the system 104.

FIG. 4 is a flow diagram of a method 400 of providing private set intersection techniques using homomorphic encryption. Specifically, the method 400 may generally be performed by the system 102 and/or one or more computing devices associated with the system 102.

At block 402, the system 102 communicates a first encrypted string of data and a second encrypted string of data to a remote computing device, such as the system 104. For example, the system 102 may use the encryption module 108 to generate a homomorphic secret key and a homomorphic public-key. The system 102 may use the homomorphic secret key to encrypt some or all of the data contained in the database 106. In some implementations, the system 102 uses the encryption module 108 and the homomorphic secret key to encrypt each of the strings of data (e.g., strings of data, $C^1$, $C^2$ and $C^3$) to generate encrypted strings of data (e.g., enc($C^1$), enc($C^2$) and enc($C^3$)). The system 102 communicates the encrypted strings of data to the system 104. The system 102 may communicate the encrypted strings of data is a batch of encrypted strings of data.

In some implementations, the system 102 communicates encrypted strings of data including encrypted strings of data (enc($C^1$), enc($C^2$) and enc($C^3$)), (enc($D^1$), enc($D^2$) and enc($D^3$)) and (enc($E^1$), enc($E^2$) and enc($E^3$)). The encrypted strings of data may be received by the system 104 as a batch of encrypted strings of data including the encrypted strings of data (enc($C^1$), enc($C^2$) and enc($C^3$)), (enc($D^1$), enc($D^2$) and enc($D^3$)) and (enc($E^1$), enc($E^2$) and enc($E^3$)).

At block 404, receives a ciphertext vector that includes ciphertext representing a plurality of numbers. In some implementations, the ciphertext vector is received at the system 102 from the system 104. In some implementations, the ciphertext included in the ciphertext vector will be ciphertext representing only a plurality of 0 s or ciphertext representing at least one or more values other than 0.

For example, in some implementations, vector and matrix multiplication performed by the system 104 generates:

$$\begin{bmatrix} a & b \\ c & d \end{bmatrix} \begin{pmatrix} X_1 \\ X_2 \end{pmatrix} = \begin{pmatrix} aX_1 + bX_2 \\ cX_1 + dX_2 \end{pmatrix} = \begin{pmatrix} d_1 \\ d_2 \end{pmatrix},$$

where a-d are the random numbers, $$\begin{pmatrix} X_1 \\ X_2 \end{pmatrix}$$

is the vector including the ciphertext values $X_1$ and $X_2$ and $$\begin{pmatrix} aX_1 + bX_2 \\ cX_1 + dX_2 \end{pmatrix}$$

is the calculated ciphertext vector that includes ciphertext represented by a ciphertext plurality numbers $$\begin{pmatrix} d_1 \\ d_2 \end{pmatrix}.$$

resulting from the calculation of $$\begin{pmatrix} aX_1 + bX_2 \\ cX_1 + dX_2 \end{pmatrix}.$$

At block 406, the system 102 receives the ciphertext vector including the plurality of ciphertext numbers $$\begin{pmatrix} d_1 \\ d_2 \end{pmatrix}$$

and uses the secret key generated by the encryption module 108 to decrypt ciphertext represented by the plurality of ciphertext numbers $$\begin{pmatrix} d_1 \\ d_2 \end{pmatrix}.$$

Specifically, the encryption module 108 may be used by the system 102 to decrypt the ciphertext numbers $d_1$ and $d_2$. When $d_1 \neq 0$ and/or $d_2 \neq 0$ the system 102 may conclude that $D^1$ and $H^1$ do not match, and $D^2$ and $H^2$ also do not match. In some implementations, each of $d_1$ and/or $d_2$ may be a non-zero modulo T, where T is a number, such as a prime number. When $d_1 \neq$ non-zero modulo T and/or $d_2 \neq$ non-zero modulo T the system 102 may conclude that $D^1$ and $H^1$ do not match, and $D^2$ and $H^2$ also do not match.

Other encryption techniques may be used with the described private set intersection techniques. For example, in some implementations, data strings may be batched together to create a vector of data strings. Each of the data strings in the vector may have a length of 64 bits, and each of the data strings may be formatted as a polynomial. The data strings and the vector may have a length greater than 64 bits. In some implementations, the data strings in the vector may be encrypted using a homomorphic encryption scheme. A compose function may be used to convert the encrypted vector data strings to a single polynomial. In one implementation, the compose function is a generalized or generic number theoretic function that may be used to generate the polynomial. The described batching, polynomial generation and encryption may be performed by the system 102.

The encrypted polynomial may be communicated to the system 104. The system 104 may convert the encrypted polynomial back to the vector with data strings encrypted therein. The system 104 may generate a vector of non-zero random numbers that corresponds to the number of data strings in the vector. For each encrypted data string contained in the vector, the system 104 may subtract a plaintext data string from a corresponding encrypted data string. The result is a vector that includes a plurality of ciphertext values. The system 104 then multiplies the vector of non-zero random numbers with the vector that includes the plurality of ciphertext values. The result is a ciphertext vector that includes ciphertext values that equal a 0 or ciphertext values that are not equal to 0. The system 104 may communicate the ciphertext vector to the system 102. The system 102 may use the ciphertext vector to ascertain if any of its data strings equal data strings stored in the system 104.

The private set intersection techniques described herein can be applied to many real world applications, such as, for example, regarding patients' medical data transfer, verification that passengers on a flight are not on a no-fly list, or the transfer of some, but not all, user data for on-line applications. These applications are described in brief below, but there are many other applications that can gainfully employ the described private set intersection techniques.

There are many scenarios where one hospital may not want to divulge the details about individual patient records to either another hospital or a server. For example, in the case where two hospitals have treated some of the same patients, it may be desirable for one hospital to transfer patient data about patients they have both treated from one hospital to another, while it would not be desirable to transfer data about all patients. In this case, the private set intersection with data transfer techniques described herein can be used to transfer patient data about patients both hospitals have treated in order for each hospital to have a complete record of these patients' medical histories.

There are also many scenarios where an airline might not want to divulge the details about travelers on their flights to a government agency or to another country. For example, an airline might not want to divulge their entire passenger list to a government agency or a foreign country in order for the government agency or the foreign country to determine if any of the passengers are on a do-not-fly list. In this case, the private set intersection with data transfer technique described herein can be used to determine which scheduled passengers on a flight are on the do-not-fly list without revealing data about the other scheduled passengers.

There are also many scenarios where one provider of an on-line service or application, for example a gaming service or application, might want to share information about users that the on-line service/application has in common with other on-line applications or services. In this case, it probably would not want to provide information about all of its users. In this case, the private set intersection with data transfer technique described herein can be used to provide information about users the two on-line services/applications have in common, without revealing data about other users.

Figure 5:
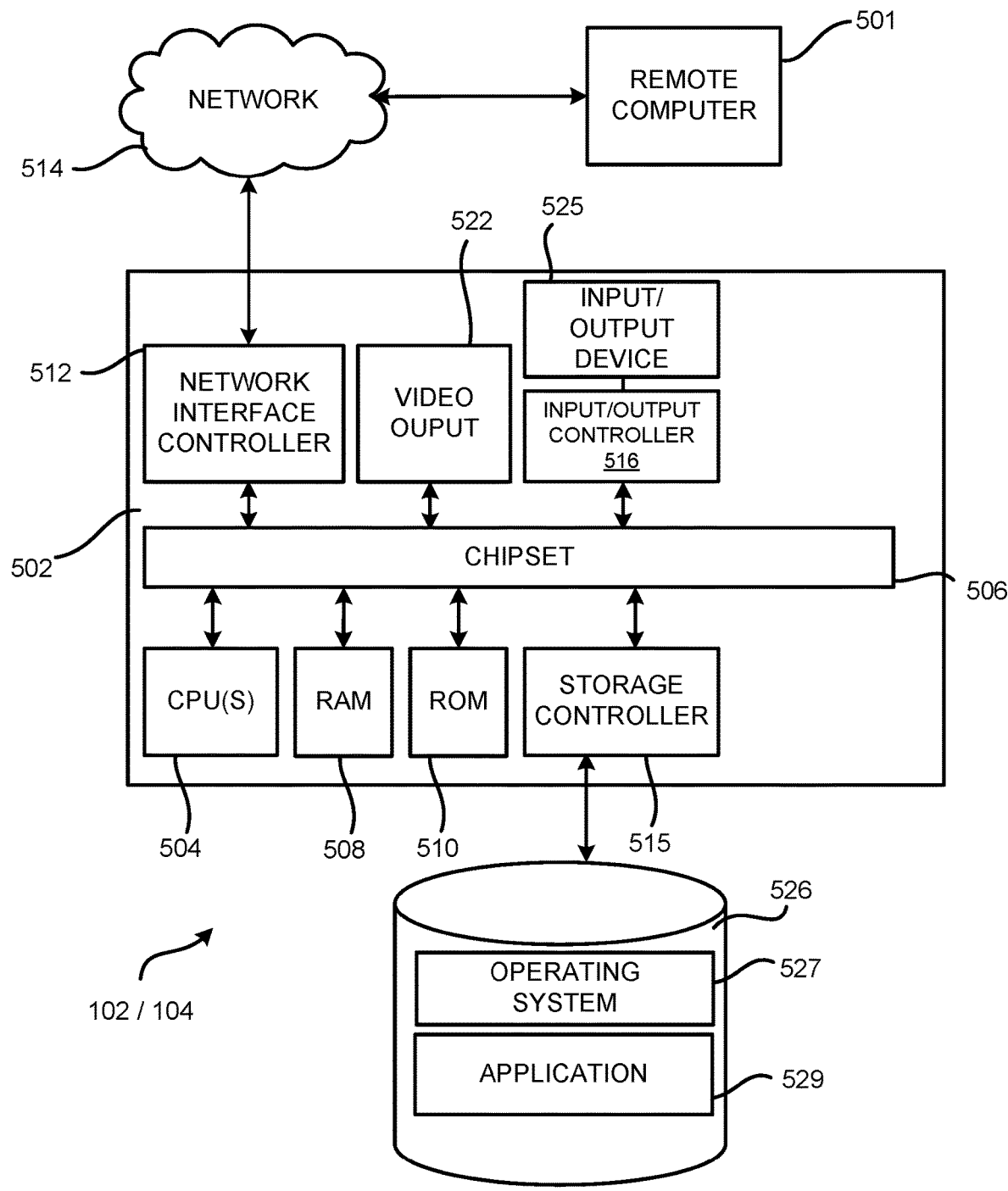
FIG. 5 is a computer architecture diagram illustrating a computing device architecture for a computing device capable of implementing aspects of the techniques and technologies presented herein.

FIG. 5 shows additional details of an example computer architecture for the components shown in FIG. 1 and FIG. 2 capable of executing the program components described above. The computer architecture shown in FIG. 5 illustrates aspects of a system, such as a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 5 may be utilized to execute any of the software components described above. Although some of the components described herein are specific to the computing devices 102 and 104, it can be appreciated that such components, and other components may be part of any suitable remote computer.

The computer architecture includes a baseboard 502, or "motherboard," which is a printed circuit board to which a multitude of components or devices may be connected by way of a system bus or other electrical communication paths. In one illustrative embodiment, one or more central processing units ("CPUs") 504 operate in conjunction with a chipset 506. The CPUs 604 may be standard programmable processors that perform arithmetic and logical operations necessary for the operation of the computer architecture.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a RAM 508, used as the main memory in the computer architecture. The chipset 506 may further provide an interface to a computer-readable storage medium such as a read-only memory ("ROM") 510 or non-volatile RAM ("NVRAM") for storing basic routines that help to startup the computing device 101 and to transfer information between the various components and devices. The ROM 610 or NVRAM may also store other software components necessary for the operation of the computer architecture in accordance with the embodiments described herein.

The computer architecture may operate in a networked environment using logical connections to remote computing devices and computer systems through a network 514, such as the local area network. The chipset 506 may include functionality for providing network connectivity through a network interface controller (NIC) 512, such as a gigabit Ethernet adapter. The NIC 512 is capable of connecting the computer architecture to other computing devices over the network 514. It should be appreciated that multiple NICs 512 may be present in the computer architecture, connecting the computer to other types of networks and remote computer systems. The network allows the computer architecture to communicate with remote services and servers, such as the remote computer 501. As can be appreciated, the remote computer 501 may host a number of services such as the XBOX LIVE gaming service provided by MICROSOFT CORPORATION of Redmond, Wash. In addition, as described above, the remote computer 501 may mirror and reflect data stored on the computer architecture and host services that may provide data or processing for the techniques described herein.

The computer architecture may be connected to a mass storage device 526 that provides non-volatile storage for the computing device. The mass storage device 526 may store system programs, application programs, other program modules, and data, which have been described in greater detail herein. The mass storage device 526 may be connected to the computer architecture through a storage controller 515 connected to the chipset 506. The mass storage device 526 may consist of one or more physical storage units. The storage controller 515 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 526, other storage media and the storage controller 515 may include MultiMediaCard (MMC) components, eMMC components, Secure Digital (SD) components, PCI Express components, or the like.

The computer architecture may store data on the mass storage device 526 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 526 is characterized as primary or secondary storage, and the like.

For example, the computer architecture may store information to the mass storage device 526 by issuing instructions through the storage controller 515 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 526 by detecting the physical states or characteristics of one or more particular locations within the physical storage units.

In addition to the mass storage device 526 described above, the computer architecture may have access to other computer-readable media to store and retrieve information, such as program modules, data structures, or other data. Thus, the application 529, other data and other modules are depicted as data and software stored in the mass storage device 526, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium,"

"computer-readable storage medium," and variations thereof, does not include waves or signals per se and/or communication media.

The mass storage device 526 may store an operating system 527 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 526 may store other system or application programs and data utilized by the computer architecture, such as any of the other software components and data described above. The mass storage device 526 might also store other programs and data not specifically identified herein.

In one embodiment, the mass storage device 526 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 504 transition between states, as described above. According to one embodiment, the computer architecture has access to computer-readable storage media storing computer-executable instructions which, when executed by the computer architecture, perform the various routines described above with regard to FIG. 3 and FIG. 4, and the other FIGURES. The computing device 101 might also include computer-readable storage media for performing any of the other computer-implemented operations described herein.

The computer architecture may also include one or more input/output controllers 516 for receiving and processing input from a number of input devices, such as a keyboard, a mouse, a microphone, a headset, a touchpad, a touch screen, an electronic stylus, or any other type of input device. Also shown, the input/output controller 516 is in communication with an input/output device 525. The input/output controller 516 may provide output to a display, such as a computer monitor, a flat-panel display, a digital projector, a printer, a plotter, or other type of output device. The input/output controller 516 may provide input communication with other devices such as a microphone, a speaker, game controllers and/or audio devices.

For example, the input/output controller 516 can be an encoder and the output device 525 can include a full speaker system having a plurality of speakers. The encoder can use a spatialization technology, and the encoder can process audio output audio or output signals received from the application 529. The encoder can utilize a selected spatialization technology to generate a spatially encoded stream that appropriately renders to the output device 525.

The disclosure presented herein may be considered in view of the following examples.

Example 1

A computing device, comprising: a processor; a memory having computer-executable instructions stored thereupon which, when executed by the processor, cause the computing device to receive a first encrypted string of data and a second encrypted string of data; compute a first ciphertext value using the first encrypted string of data and a first string of data; compute a second ciphertext value using the second encrypted string of data and a second string of data; multiply a vector including the first ciphertext value and the second ciphertext value with a matrix to provide a ciphertext vector that includes ciphertext representing only a plurality of 0s or ciphertext representing one or more values other than 0, when the ciphertext vector includes only ciphertext representing a plurality of 0 s, the first encrypted string of data is equal to the first string of data and the second encrypted string of data is equal to the second string of data, and when the ciphertext vector includes ciphertext representing one or more values other than 0, at least the first encrypted string of data is not equal to the first string of data or the second encrypted string of data is not equal to the second string of data.

Example 2

The computing device according to example 1, wherein the first string of data and the second string of data are in unencrypted plaintext format.

Example 3

The computing device according to examples 1 and 2, wherein the matrix includes a plurality of numbers chosen randomly.

Example 4

The computing device according to example 3, wherein the matrix is an invertible matrix.

Example 5

The computing device according to examples 1, 2, 3 and 4, wherein the first string of data and the second string of data are in unencrypted plaintext format, and the first string of data and the second string of data include user contact information.

Example 6

The computing device according to examples 1, 2, 3, 4 and 5, wherein the first encrypted string of data and the second encrypted string of data comprise user related data stored in a storage associated with a remote computing device, and the first string of data and the second string of data comprise user related data stored in a storage associated with the computing device.

Example 7

The computing device according to examples 1, 2, 3, 4, 5 and 6, wherein the memory having computer executable-instructions stored thereupon which, when executed by the processor, cause the computing device to receive a plurality of encrypted strings of data comprising the first encrypted string of data and the second encrypted string of data.

Example 8

The computing device according to examples 1, 2, 3, 4, 5, 6 and 7, wherein the first encrypted string of data and the second encrypted string of data were encrypted using a homomorphic encryption scheme.

Example 9

A computing device, comprising: a processor; a memory having computer-executable instructions stored thereupon which, when executed by the processor, cause the computing device to communicate a first encrypted string of data and a second encrypted string of data to a remote computing device; receive a ciphertext vector that includes only ciphertext representing a plurality of 0 s or ciphertext representing one or more values other than 0, when the ciphertext vector includes ciphertext representing only a plurality of 0 s, the first encrypted string of data is equal to a first string of data and the second encrypted string of data is equal to a second string of data, and when the ciphertext vector includes ciphertext representing one or more values other than 0, at least the first encrypted string of data is not equal to the first string of data or the second encrypted string of data is not equal to a second string of data.

Example 10

The computing device according to example 9, wherein the first string of data and the second string of data are stored in a storage associated with the computing device.

Example 11

The computing device according to examples 9 and 10, wherein the memory having computer-executable instructions thereupon which, when executed by the processor, cause the computing device to use a homomorphic encryption scheme to generate the first encrypted string of data and the second encrypted string of data.

Example 12

The computing device according to examples 9, 10 and 11, wherein the first string of data and the second string of data are in unencrypted plaintext format and stored in a storage associated with the computing device.

Example 13

The computing device according to examples 9, 10, 11 and 12, wherein the ciphertext of the ciphertext vector is generated at least in part using a matrix including a plurality of numbers chosen randomly.

Example 14

The computing device according to examples 9, 10, 11, 12 and 13, wherein the matrix including the plurality of numbers chosen randomly is invertible.

Example 15

The computing device according to example 14, wherein the first encrypted string of data and the second encrypted string of data comprise user related data stored in a storage associated with the computing device, and the first string of data and the second string of data are stored in a storage associated with the remote computing device.

Example 16

The computing device according to examples 9, 10, 11, 12, 13, 14 and 15, wherein the memory having computer-executable instructions thereupon which, when executed by the processor, cause the computing device to use a homomorphic encryption scheme to decrypt the ciphertext of the ciphertext vector to determine if the ciphertext vector includes only the plurality of 0 s or the one or more values other than 0.

Example 17

A nontransitory computer readable medium having stored thereon software instructions that, when executed by a computer, cause the computer to perform operations comprising: communicating a first encrypted string of data and a second encrypted string of data to a remote computing device; receiving a ciphertext vector that includes only ciphertext representing a plurality of 0 s or ciphertext representing one or more values other than 0, when the ciphertext vector includes ciphertext representing only a plurality of 0 s, the first encrypted string of data is equal to a first string of data and the second encrypted string of data is equal to a second string of data, and when the ciphertext vector includes ciphertext representing one or more values other than 0, at least the first encrypted string of data is not equal to the first string of data or the second encrypted string of data is not equal to a second string of data.

Example 18

The computer readable medium according to example 17, comprising using a homomorphic encryption scheme to decrypt the ciphertext of the ciphertext vector to determine if the ciphertext vector includes only the plurality of Os or the one or more values other than 0.

Example 19

The computer readable medium according to example 17 and 18, using a homomorphic encryption scheme to generate the first encrypted string of data and the second encrypted string of data.

Example 20

The computer readable medium according to example 17, 18 and 19, wherein the first encrypted string of data and the second encrypted string of data comprise user related data stored in a storage associated with the computer, and the first string of data and the second string of data are stored in a storage associated with the remote computing device.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A computing device, comprising:
a processor;
a memory having computer-executable instructions stored thereupon which, when executed by the processor, cause the computing device to
receive a first encrypted string of data and a second encrypted string of data, the first encrypted string of data and the second encrypted string of data received by the computing device, wherein the first encrypted string of data and the second encrypted string of data are encrypted using a homomorphic encryption scheme;

compute, by the computing device, a first ciphertext value using the first encrypted string of data and a first string of data;

compute, by the computing device, a second ciphertext value using the second encrypted string of data and a second string of data;

multiply, by the computing device, a vector including the first ciphertext value and the second ciphertext value with a matrix to provide a ciphertext vector that includes ciphertext representing only a plurality of 0s or ciphertext representing one or more values other than 0, when the ciphertext vector includes only ciphertext representing a plurality of 0s, the first encrypted string of data is equal to the first string of data and the second encrypted string of data is equal to the second string of data, and when the ciphertext vector includes ciphertext representing one or more values other than 0, at least the first encrypted string of data is not equal to the first string of data or the second encrypted string of data is not equal to the second string of data; and communicate the ciphertext vector to another computing device that provided the first encrypted string of data and the second encrypted string of data, the ciphertext vector enabling the another computing device to decrypt the ciphertext of the ciphertext vector using the homomorphic encryption scheme to generate unencrypted data, the another computing device to determine if unencrypted data of the first encrypted string of data is equal to the first string of data and if unencrypted data of the second encrypted string of data is equal to the second string of data.

2. The computing device according to claim 1, wherein the first string of data and the second string of data are in unencrypted plaintext format.

3. The computing device according to claim 1, wherein the matrix includes a plurality of numbers chosen randomly.

4. The computing device according to claim 3, wherein the matrix is an invertible matrix.

5. The computing device according to claim 1, wherein the first string of data and the second string of data are in unencrypted plaintext format, and the first string of data and the second string of data include user contact information.

6. The computing device according to claim 1, wherein the first encrypted string of data and the second encrypted string of data comprise user related data stored in a storage associated with a remote computing device, and the first string of data and the second string of data comprise user related data stored in a storage associated with the computing device.

7. The computing device according to claim 1, wherein the memory having computer executable-instructions stored thereupon which, when executed by the processor, cause the computing device to receive a plurality of encrypted strings of data comprising the first encrypted string of data and the second encrypted string of data.

8. A computing device, comprising:
a processor;
a memory having computer-executable instructions stored thereupon which, when executed by the processor, cause the computing device to
communicate a first encrypted string of data and a second encrypted string of data to a remote computing device, wherein the first encrypted string of data and the second encrypted string of data are encrypted using a homomorphic encryption scheme;

receive, by the computing device and from the remote computing device, a ciphertext vector that includes only ciphertext representing a plurality of 0s or ciphertext representing one or more values other than 0, the ciphertext vector obtained using a matrix and a vector including at least one ciphertext value, when the ciphertext vector includes ciphertext representing only a plurality of 0s, the first encrypted string of data is equal to a first string of data and the second encrypted string of data is equal to a second string of data, and when the ciphertext vector includes ciphertext representing one or more values other than 0, at least the first encrypted string of data is not equal to the first string of data or the second encrypted string of data is not equal to a second string of data, cause the computing device to use the homomorphic encryption scheme to decrypt the ciphertext of the ciphertext vector to generate unencrypted data, and determine, by the computing device, if unencrypted data of the first encrypted string of data is equal to the first string of data and if unencrypted data of the second encrypted string of data is equal to the second string of data.

9. The computing device according to claim 8, wherein the first string of data and the second string of data are stored in a storage associated with the computing device.

10. The computing device according to claim 8, wherein the first string of data and the second string of data are in unencrypted plaintext format and stored in a storage associated with the computing device.

11. The computing device according to claim 8, wherein the ciphertext of the ciphertext vector is generated at least in part using the matrix, the matrix including a plurality of numbers chosen randomly.

12. The computing device according to claim 11, wherein the matrix including the plurality of numbers chosen randomly is invertible.

13. The computing device according to claim 8, wherein the first encrypted string of data and the second encrypted string of data comprise user related data stored in a storage associated with the computing device, and the first string of data and the second string of data are stored in a storage associated with the remote computing device.

14. The computing device according to claim 8, wherein the memory having computer-executable instructions thereupon which, when executed by the processor, cause the computing device to use a homomorphic encryption scheme to decrypt the ciphertext of the ciphertext vector to determine if the ciphertext vector includes only the plurality of 0s or the one or more values other than 0.

15. A non-transitory computer readable medium having stored thereon software instructions that, when executed by a computer, cause the computer to perform operations comprising:
communicating a first encrypted string of data and a second encrypted string of data to a remote computing device, wherein the first encrypted string of data and the second encrypted string of data are encrypted using a homomorphic encryption scheme;
receiving a ciphertext vector that includes only ciphertext representing a plurality of 0s or ciphertext representing one or more values other than 0, the ciphertext vector obtained using a matrix and a vector including at least one ciphertext value,
   when the ciphertext vector includes ciphertext representing only a plurality of 0s, the first encrypted string of data is equal to a first string of data and the second encrypted string of data is equal to a second string of data, and
   when the ciphertext vector includes ciphertext representing one or more values other than 0, at least the first encrypted string of data is not equal to the first string of data or the second encrypted string of data is not equal to a second string of data,
decrypting the ciphertext of the ciphertext vector using the homomorphic encryption scheme to generate unencrypted data, and
determining if unencrypted data of the first encrypted string of data is equal to the first string of data and if unencrypted data of the second encrypted string of data is equal to the second string of data.

16. The non-transitory computer readable medium according to claim 15, comprising using a homomorphic encryption scheme to decrypt the ciphertext of the ciphertext vector to determine if the ciphertext vector includes only the plurality of 0s or the one or more values other than 0.

17. The non-transitory computer readable medium according to claim 15, wherein the first encrypted string of data and the second encrypted string of data comprise user related data stored in a storage associated with the computer, and the first string of data and the second string of data are stored in a storage associated with the remote computing device.

* * * * *